Oct. 30, 1962

H. M. McCALL 3,060,695

COLLAPSIBLE PILE CORE

Filed March 20, 1958

INVENTOR.
HAROLD M. McCALL.
BY
Ward, Neal, Haselton Orme & McChannon
ATTORNEYS.

Oct. 30, 1962 H. M. McCALL 3,060,695
COLLAPSIBLE PILE CORE
Filed March 20, 1958 10 Sheets-Sheet 2

INVENTOR.
HAROLD M. McCALL.
BY
Ward, Neal, Haselton, Orme & McElhannon
ATTORNEYS.

Oct. 30, 1962 H. M. McCALL 3,060,695
COLLAPSIBLE PILE CORE
Filed March 20, 1958 10 Sheets-Sheet 8

INVENTOR.
HAROLD M. McCALL.
BY
Ward, Neal, Haselton, Orme & McElhannon
ATTORNEYS.

Oct. 30, 1962 H. M. McCALL 3,060,695
COLLAPSIBLE PILE CORE
Filed March 20, 1958 10 Sheets—Sheet 9

INVENTOR.
HAROLD M. McCALL.
BY
Ward, Neal, Haselton, Orme & McElhannon
ATTORNEYS.

Oct. 30, 1962    H. M. McCALL    3,060,695
COLLAPSIBLE PILE CORE
Filed March 20, 1958    10 Sheets-Sheet 10

INVENTOR.
HAROLD M. McCALL.
BY
Ward, Neal, Haselton, Orme & McElhannon
ATTORNEYS.

United States Patent Office 3,060,695
Patented Oct. 30, 1962

3,060,695
COLLAPSIBLE PILE CORE
Harold M. McCall, Fairlawn, N.J., assignor to Raymond International Inc., a corporation of New Jersey
Filed Mar. 20, 1958, Ser. No. 722,733
18 Claims. (Cl. 61—53.72)

This invention relates to collapsible pile driving cores and more particularly to a collapsible core construction adapted for use in driving pile shells for concrete piles.

In constructing cast-in-place concrete piles it is customary to drive a relatively thin-walled pile shell into the ground and then pour concrete into the shell to form the finished pile. Since the use of shells having sufficient strength alone to withstand the impact of the driving hammer would be too expensive for competitive purposes, the shells are driven with the aid of driving cores which extend into the shell and transmit the driving force to the shell while at the same time preventing its collapse. When the shell has been driven to the desired depth, the driving core is removed and concrete is poured into the shell to form the finished pile. When the shell to be driven is of longitudinally tapered design, a driving core having a tapered cross section is generally used since such a core can contact the shell continuously or at frequent intervals throughout its length and the driving force may be thus imparted to the shell substantially throughout its length. This allows a light weight, inexpensive shell to be used. In the case of a straight-sided shell, collapsible straight-sided cores (which transmit the driving force to the shell by means of peripheral ridges or the like) are commonly used, whereas for driving shells of the so-called "step-taper" design, step taper cores of appropriate dimension are used so that the driving force is transmitted from the core to the shell through the step portions.

Experience has shown that one of the greatest problems encountered in driving a pile shell with a removable core is the removal of the core after driving the shell to the desired depth. This difficulty arises due to the fact that during driving the core becomes so tightly wedged in the shell that the force required to overcome the friction between the core and the shell may be greater than the force required to overcome the friction between the shell and the ground. Various methods of overcoming this difficulty have been proposed. One such method for use with tapered shells and cores involves apparatus by which an upward force is exerted on the core while at the same time a downward force is exerted on the pile shell. This arrangement is generally unsatisfactory, especially in view of the excessive forces which must be applied to the top of the pile shell while withdrawing the core. The application of such great forces on the top of the pile shell necessitates the use of exceptionally strong and, therefore, expensive shells.

Various types of collapsible cores have also been proposed for use with tapered or straight-sided shells in an effort to solve this problem of withdrawal after driving. Such cores can be collapsed and then withdrawn from the shell with considerably less effort than would be required with a non-collapsible core. Unfortunately these cores have also been found to be not completely satisfactory. One of the more successful types of collapsible driving core which has been used previously utilizes a core basically comprising several segments held apart from a center piece running the length of the core by means of wedge-like surfaces. During driving the wedge-like surfaces force the segments away from the center piece and against the interior wall of the pile shell. When the driving has been completed, the core is collapsed by forcing the center piece upwards thereby releasing the wedge-like surfaces and allowing the core segments to collapse inwardly toward the center piece and away from the interior of the shell. The core in its collapsed condition may then be withdrawn from the pile shell with relatively little force. However, in driving such a core oftentimes the impact characteristics of the center piece and the segments may be quite different and there is, therefore, relative motion under each hammer blow with resultant wear on the bearings or wedges separating the segments from the center piece. Also, in a core made up of segments surrounding a center piece, the driving force is transmitted to the segments through the center piece and this necessitates the use of a very sturdy and heavy core if excessive breakage during driving is to be avoided.

The instant invention provides an improved collapsible draving core which overcomes the aforesaid disadvantages of the previously known collapsible cores and moreover provides a rugged core construction which may be readily removed from a shell after driving.

In general, the present invention involves a driving core having a plurality of longitudinally extending leaf structures movable outwardly to a larger expanded core diameter and inwardly to a smaller collapsed core diameter, such leaf structures being relatively movable longitudinally and longitudinally inclined engaging surfaces are cooperatively disposed in lateral register on opposed sides of adjacent relatively movable leaf structures lengthwise thereof in such a way as to urge said leaf structures outwardly when said leaf structures are moved relatively longitudinally toward each other and to permit inward movement of said leaf structures to collapsed condition when said leaf structures are moved relatively longitudinally away from each other.

Cores constructed in accordance with the invention may be straight sided or tapered and may have two or more leaf structures. Such cores may also be step tapered or include in one core a combination of the various forms such as straight sided, tapered or step tapered design, depending upon the shape of the pile shell to be driven.

Various, further and more specific objects, features and advantages of this invention will appear from the description taken in connection with the accompanying drawings which form a part of this specification and illustrate by way of example the presently preferred embodiments of this invention.

Figures 1, 3:
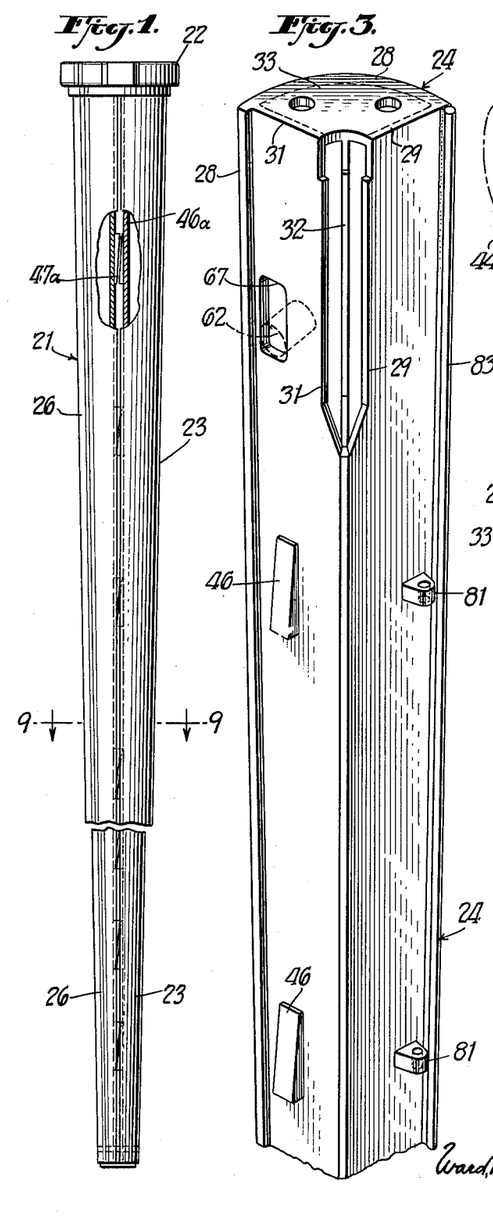
FIG. 1 is an elevational view partially in section showing a collapsible pile core constructed in accordance with the invention.
FIG. 3 is an enlarged fragmentary perspective view showing in greater detail certain features of one of the leaves of the pile core shown in FIG. 1.

Referring to FIGS. 1–13 and particularly to FIG. 1, a pile core designated in general as 21 is shown having a cross section which tapers gradually from its widest point at its upper end to a relatively narrow tip at its lower end. When in expanded condition such core is of predetermined shape and size snugly to fit within and support a correspondingly tapered pile shell to be driven (not shown). The taper of the core 21 may be of any conventional degree corresponding to the shell to be driven and in the present embodiment, for instance, is about 0.4 inch per foot. Similarly, the core may be of any suitable length and, for example in a typical embodiment, about 40 feet.

The core 21 comprises basically a core head 22 (FIG. 2), a plurality of complementary leaves 23, 24 and 26 and a centrally disposed collapsing bar 27. Each of such leaves is of generally sector shape and extends the length of the core as shown in FIG. 1. These leaves cooperate jointly to provide an internal support for the pile shell. The construction of the leaves is shown in greater detail in FIGS. 3, 9 and 10 where it can be seen, for example, that leaf 24 has its generally sector shaped cross section formed by an arcuate outer plate 28 and a pair of radially disposed plates 29 and 31 welded along respectively opposite vertical margins of plate 28. Leaf 24 may be further stiffened by a radially disposed intermediate stiffening plate 32 and a top plate 33 welded in position to provide additional support as shown. Each of the leaves thus is a relatively rigid structure which, however, has sufficient yieldability to withstand severe driving forces. Leaf 23 (FIGS. 2, 9 and 10) is similarly constructed and comprises an arcuate plate 28a and radially disposed vertical plates 29a, 31a and 32a, and a top plate 33a; leaf 26 also is similarly constructed and comprises corresponding members 28b, 29b, 31b, 32b and 33b.

Figure 2:
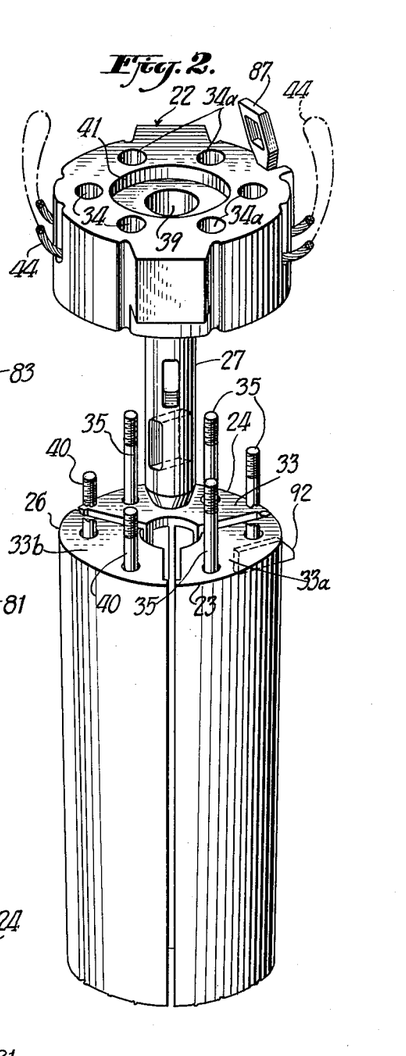
FIG. 2 is an exploded perspective view showing in greater detail a portion of the pile core shown in FIG. 1.
Figures 4, 6:
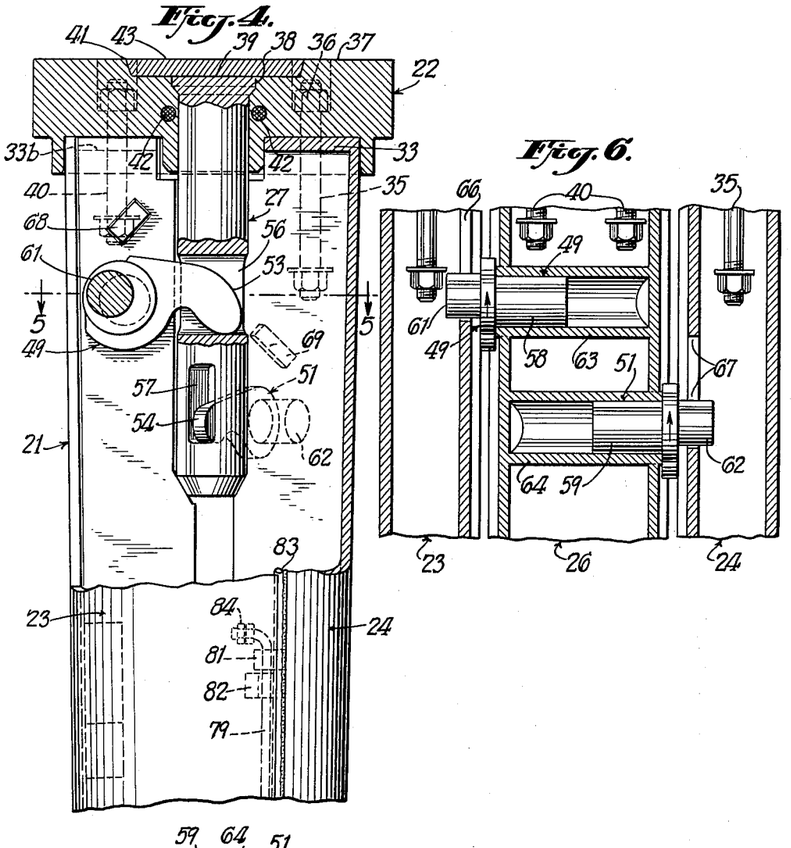
FIG. 4 is an enlarged elevational view partly in vertical section showing further details of a portion of the pile core shown in FIG. 1.
FIG. 6 is a vertical sectional view taken along line 6—6 of FIG. 5.

As shown in FIGS. 2 and 4, core head 22 is provided with a plurality of vertically extending holes such as 34 through which short bolts as at 40 extend, and also a plurality of vertically extending holes as at 34a through which long bolts as at 35 extend. The long bolts 35 pass upwardly through cooperating holes formed in the end pieces 33 and 33a of leaves 24 and 23 with the bolt heads spaced considerably below said end pieces; and the short bolts 40 pass upwardly through cooperating holes in the end piece 33b of leaf 26 with the heads spaced below the end piece 33b at a less distance than those of bolts 35. The bolts 35 and 40 are sufficiently small with respect to the holes through which they pass so as to be free for longitudinal movement with respect to such holes in order to support the leaf structures during withdrawal of the pile core from the pile shell after driving as described below. The upper ends of these bolts are provided with nuts 36 which are recessed below the top surface 37 of core head 22. The collapsing bar or rod 27 passes downwardly through a central bore in the core head 22 (FIG. 4) and is provided at its upper end with an enlarged head 38 snugly seated in a cooperating recess countersunk so that when the collapsing bar is in position, its upper surface 39 is flush with the lower surface of a recess 41 in the top of the core head. The core head may also be provided with horizontally extending holes 42 through which a wire sling 44 may pass for the purpose of lifting the core head as described below.

Figure 9:
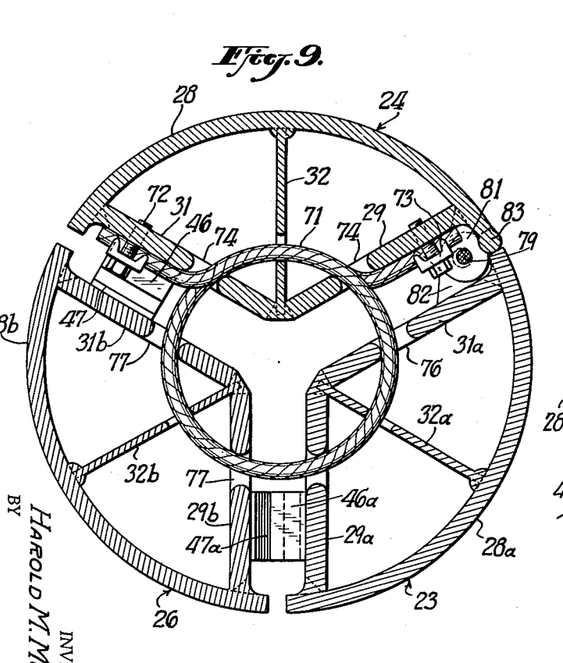
FIG. 9 is an enlarged sectional view taken along line 9—9 of FIG. 1 showing the pile core in its expanded condition.
Figure 10:
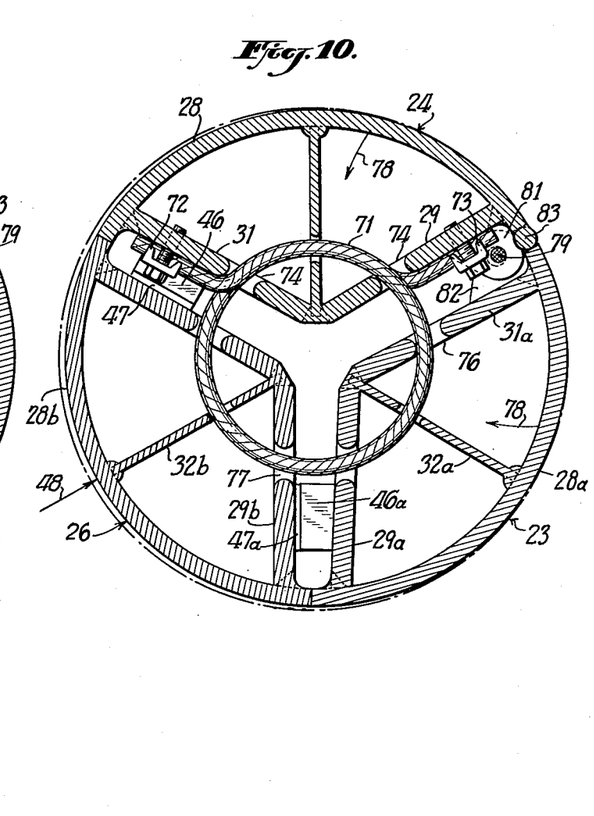
FIG. 10 is a sectional view similar to FIG. 9 but showing the pile core in its contracted or collapsed condition.

The leaves 24 and 26 of the core are separated from each other by a plurality of axially spaced wedges as at 46 carved or otherwise formed or fixed on one face of one leaf such as 24, and oppositely tapered cooperating axially spaced wedges such as 47 on the adjacent face of the other leaf 26 as shown in FIGS. 1, 3, 9 and 10. Similar pairs of wedges such as 46a and 47a are used to separate leaf 23 from leaf 26. The cooperating pairs of wedges are located at spaced positions throughout the length of the core as shown in FIG. 1. When the wedges are aligned as shown in FIGS. 1 and 9 the core is in its expanded condition and the leaves are properly aligned for driving. When leaf 26 is moved upwards with respect to leaves 23 and 24 the action of the wedges allows leaf 26 to move closer to the center of the core thus collapsing the core as shown in FIG. 10, so that it may be withdrawn from the pile shell.

When the core is to be used in driving a tapered pile shell it is first fitted within the shell in its expanded condition as shown in FIG. 1. A metal plate 43 (FIG. 4) is fitted into the recess 41 in core head 22 so that the driving force may be applied alike to the core head and the upper surface 39 of the collapsing bar 27. Driving force is preferably transmitted from a power source, such as a pile driving hammer, to the core head through suitable intermediate means such as a wooden block (not shown) in order to distribute the force of the blow substantially throughout the upper surface of the core head. The force of the driving blows is thus distributed to both the collapsing bar and the leaves so that all portions of the core are subjected to approximately the same driving forces. Due to the taper of the core and the corresponding taper of the shell, the core forces itself tightly down into the shell during driving and forces the shell into the ground. When driving has been completed it is necessary, due to the tight fit thus produced between the core and the shell, to collapse the core prior to withdrawing it from the shell. The core may be collapsed by exerting sufficient separating force between leaf 26 and leaves 23 and 24 in an axial direction.

Figure 5:
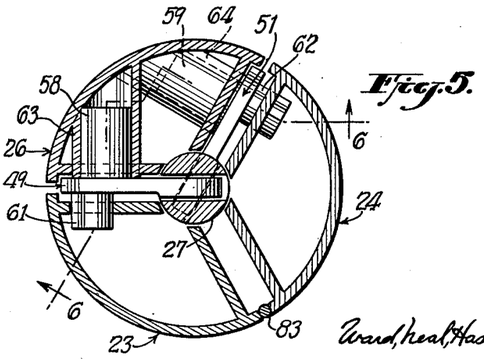
FIG. 5 is a cross sectional view taken along line 5—5 of FIG. 4.

However, the core is frequently wedged so tightly within the pile shell when driving is completed that it is impossible to collapse it merely by a straight upward pull on leaf 26. Provision is, therefore, made for obtaining additional force acting to collapse the core by the use of ecentric levers 49 and 51 as shown in FIGS. 4–8. These include cam portions 53 and 54 whose outer ends are positioned respectively in slots 56 and 57 cut through the collapsing bar 27. Levers 49 and 51 also carry, remote from the above mentioned cam portions, cylindrical bearing extensions 58 and 59 and smaller eccentric extensions 61 and 62 which extend in opposite directions respectively from the bearing extensions 58 and 59. As shown in FIGS. 5 and 6, the bearing extensions 58 and 59 rotate in cylindrical bearings 63 and 64 which are permanently secured in leaf 26 as by welding. The eccentric extensions 61 and 62 project into slots 66 and 67 located in leaves 23 and 24 respectively and engage the lower sides thereof (see FIGS. 3 and 6 for example). These slots allow leaf 26 to be drawn upwards with respect to leaves 23 and 24 after the core has been collapsed as described below.

Since, due to the spacing of the lower ends of bolts 35 and 40 from the core head the leaves of core 21 when in expanded position are not directly secured to the core head, upward movement of the core head such as by lifting on the wire sling 44 previously described, results only in upward movement of the collapsing bar 27. This raising of the collapsing bar forces the cams 53 and 54 upwards and results in a leverage effect coming into play to apply an upward force on the large bearing extensions 58 and 59 and a downward force on the eccentric extensions 61 and 62. This effect is increased due to the mechanical advantage obtained by applying the initial lifting force to the cam portion remote from said extensions.

Figure 7:
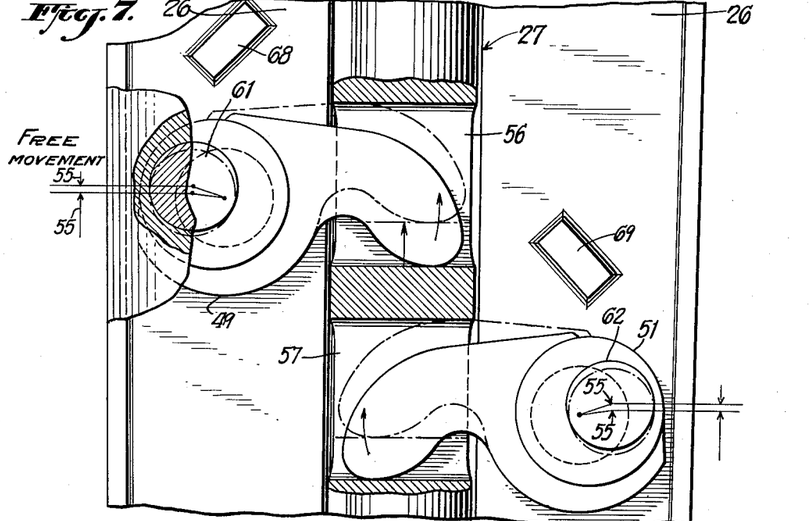
FIG. 7 is a somewhat diagrammatic illustration showing the movement of certain parts of the pile core shown in FIG. 1 at the commencement of collapsing the core.
Figure 8:
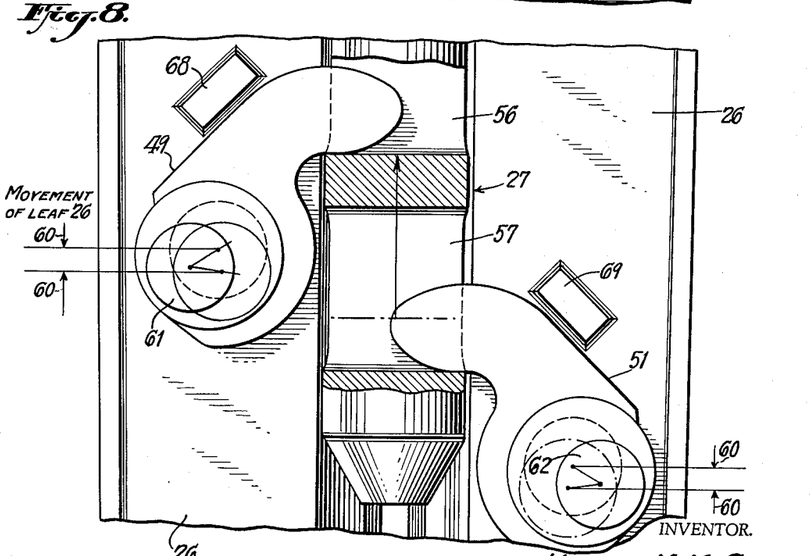
FIG. 8 is a view similar to FIG. 7 but showing the position of the parts at a later stage in the collapsing of the core.

Since, when the core is in its expanded condition following driving, further downward movement of any of the leaves is prevented by the pile shell, the net effect of the upward force applied on leaf 26 by the bearing extensions 58 and 59 and the downward force applied on leaves 23 and 24 by the eccentric extensions 61 and 62 is force leaf 26 upwards with respect to leaves 23 and 24 (which remain stationary). This movement is shown more clearly in FIGS. 7 and 8. In FIG. 7 the position of levers 49 and 51 when the core is in its expanded condition prior to lifting the collapsing bar is shown in solid lines. As the collapsing bar 27 begins its upwards movement there is a small amount of free movement in the mechanism because of a small space then existing between the eccentric extensions 61, 62 of the levers and the bottoms of the slots in leaves 23 and 24 in which these extenisons protrude. This allows the eccentric extensions 61 and 62 to move downward a small distance as indicated by the arrows 55 in FIG. 7 before any movement of the leaves relative to each other commences. As the collapsing bar 27 is raised further, the eccentric extensions press downward against the bottoms of the slots in leaves 23 and 24 and the bearing extensions 58 and 59 press upwardly against the bearings fixed in leaf 26 as described above. As a result leaf 26 moves upwardly with respect to leaves 23 and 24 through a distance indicated by the arrows 60 in FIG. 8, thereby initiating the collapse of the core. FIG. 8 shows the position of levers 49 and 51 when the collapsing bar has been lifted approximately 6 inches to the point where the short bolts 40 engage the top plate 33b of leaf 26 thereby causing leaf 26 to be supported from the core head 22 by the short bolts. Leaf 26 then continues to be drawn upwards by the bolts 40 until the core head 22 has been raised far enough so that the longer bolts 35 engage the top plates of leaves 23 and 24 after which the entire unit is raised by further raising of the core head.

In order to prevent the levers 49 and 51 from jumping out of the slots in collapsing bar 27 during its raising, lever stops 68 and 69 are provided. These levers stops may be secured to leaf 26 as by welding.

The three leaves of the pile core may be tied together at various points throughout their length by pieces of wire cable, one of which is illustrated in FIGS. 9 and 10 at 71. This cable is secured at each end by cable clamps 72 and 73 which in turn are secured to leaf 24 as shown. From clamp 72 the cable passes through holes such as 74 in leaf 24, and at 76 in leaf 23, and axially extending slots such as 77 in leaf 26. The wire cable then passes again through the holes in leaf 24 and is secured at its other end by clamp 73. Axially extending slots rather than round holes are provided in leaf 26 to allow for the relative upward movement of leaf 26 with respect to leaves 23 and 24 when the core is collapsed. The length or tightness of the cables such as 71 and the length of the slots such as 77 are preferably adjusted so that, as leaf 26 moves upward with respect to leaves 23 and 24 the cables tighten and thus assist in the inward collapse of leaves 23 and 24 described below.

Figure 11:
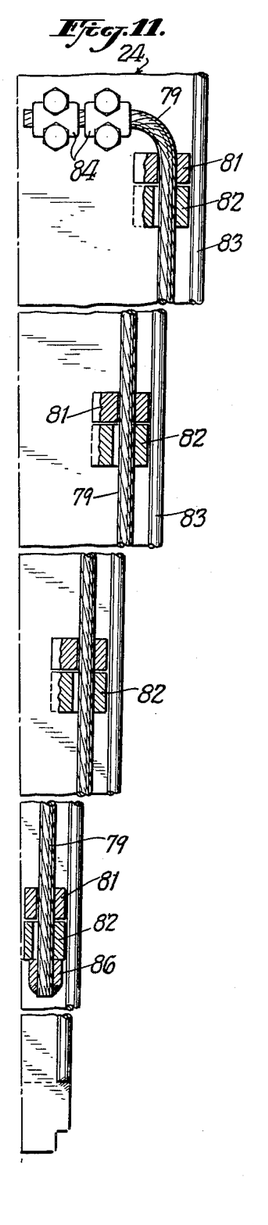
FIG. 11 is a fragmentary longitudinal sectional view partially broken away showing further details of construction of the pile core shown in FIG. 1.

In addition to the inward and upward collapsing movement of leaf 26, it is highly desirable to provide means by which leaves 23 and 24 can be collapsed inwardly at least a small distance. This is provided for by hinging leaves 23 and 24 with respect to each other so that they are free to swing inwardly a small distance toward each other as indicated by the arrows 78 in FIG. 10. As shown in FIG. 11, the hinge connection between leaves 23 and 24 is formed by a wire cable 79 acting somewhat as a pintle which passes through upper hinge pieces such as 81 (see also FIGS. 3 and 4) which are secured to leaf 24 and lower hinge pieces such as 82 which are secured to leaf 23. The lower hinge pieces have sligthly expanded openings (FIG. 11) so that leaf 23 can move slightly in a lateral direction with respect to leaf 24. As a further part of the arrangement for hingedly connecting leaves 23 and 24 together, a rod 83 is secured as by welding to the vertical edge of the outer plate 28 of leaf 24 (FIGS. 3 and 10) substantially throughout its length. Rod 83 may be so positioned with respect to the vertical edge of leaf 23 that such edge turns in contact with rod 83 during the collapsing of the core with relative lateral movement of the leaves 23 and 24 being provided for by the expanded openings in the lower hinge portions 82, or rod 83 may be positioned so that there exists a space between it and the vertical edge of leaf 23 when the core is in its collapsed condition thus allowing leaves 23 and 24 to pivot about the cable 79. The cable is secured to leaf 24 at its upper end by cable clamps such as 84 (FIG. 11) and is suitably secured at its lower end as by welding to the leaf 24 as shown at 86.

Figure 12:
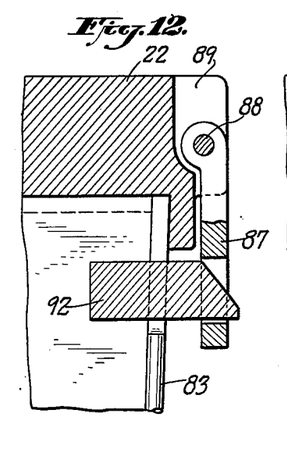
FIG. 12 is an enlarged partial vertical sectional view showing certain additional details of construction of the pile core shown in FIG. 1.
Figure 13:
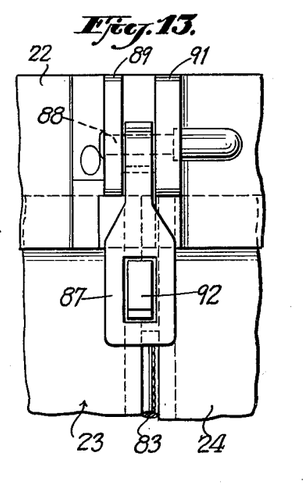
FIG. 13 is an enlarged external elevational view showing the same parts shown in FIG. 12.
Figure 14:
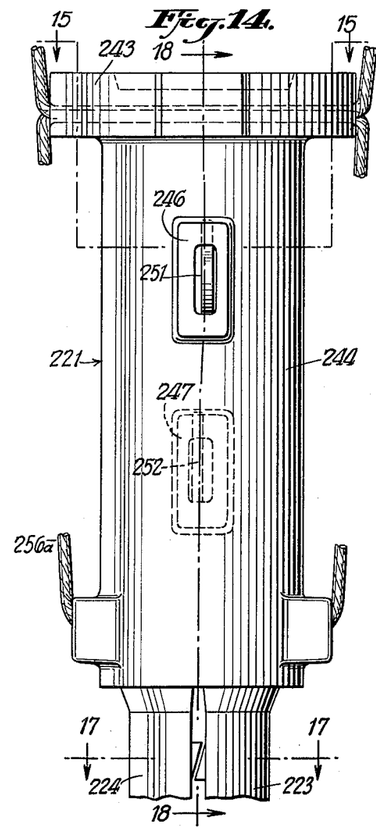
FIG. 14 is an elevational view showing the upper portion of a modified form of pile core constructed in accordance with the invention.
Figure 15:
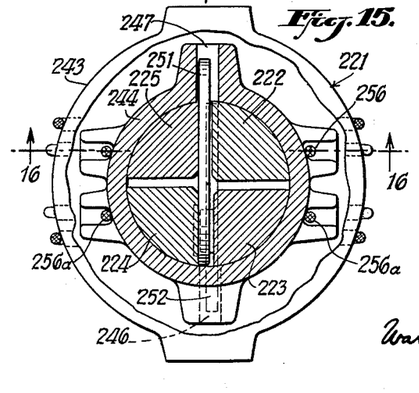
FIG. 15 is a cross sectional view taken along line 15—15 of FIG. 14.
Figure 16:
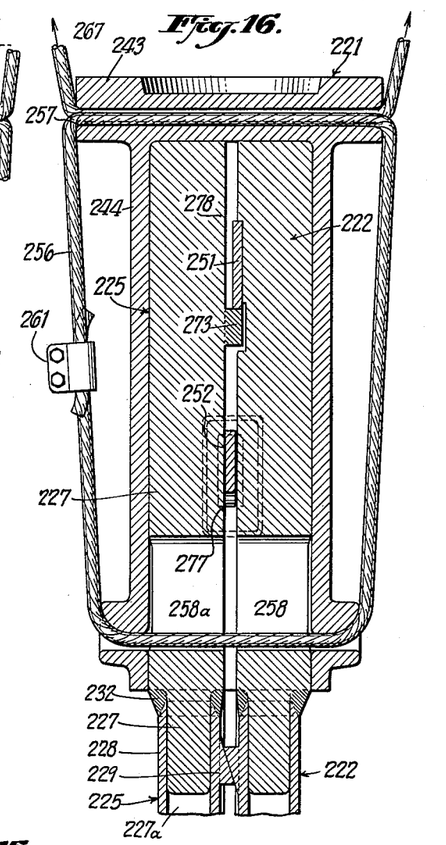
FIG. 16 is a vertical sectional view of the embodiment shown in FIG. 14 taken as indicated by section line 16—16 of FIG. 15.

In order to hold the leaves together in an expanded condition while the core is being placed in a pile shell prior to driving, a latch 87 is provided (FIGS. 12 and 13). Such latch is attached to core head 22 by a latch pin 88 passing through lugs 89 and 91 integrally formed on the head 22. This latch is adapted to engage a laterally extending lug 92 which is permanently secured to leaf 23 and the latch is normally left engaged during driving but must, of course, be released prior to collapsing the core. After the core has been withdrawn from the driven pile shell in its completely collapsed condition, the leaves are all supported from the core head by the bolts 35 and 40 passing through the core head and engaging the top plates of the respective leaves. The core may then be lowered until the tips of all the leaves are supported by a level solid surface such as a timber at which point the core is, in effect, in its expanded condition. The latch 87 may then be engaged so as to held the core in the expanded condition until it is desired to collapse it again. Although the lug 92 is fastened only to leaf 23, the engagement of this lug with latch 87 serves effectively to hold the entire core in its expanded condition. Since the lower hinge pieces such as 82 are secured to leaf 23 while the upper hinge pieces such as 81 are secured to leaf 24, leaf 23 serves to support leaf 24 by means of the hinge pieces. Likewise, it can be seen that so long as leaves 23 and 24 are held up against the core head by the latch 87 the levers 49 and 51 will serve to prevent any downward movement of leaf 26. Such downward movement of leaf 26 is further prevented by the operation of the wedges such as 46 and 47 and the wire cable ties such as 71.

Figure 17:
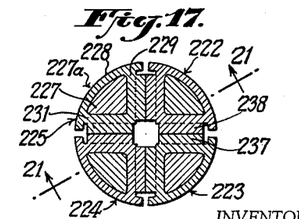
FIG. 17 is a cross sectional view taken along line 17—17 of FIG. 14.

FIGS. 14–22 illustrate a modified embodiment of the invention in which a collapsible pile core comprises four leaves. This core as shown is of a straight-sided design adapted to drive corresponding straight-sided pile shells but, of course, it should be understood that the same may be of tapered design if desired for use with tapered shells. Referring to FIGS. 14–19, a pile core designated in general as 221 comprises leaves 222, 223, 224 and 225. As can be seen from the drawings, each of the leaves has a sector shaped solid upper portion and a similarly shaped hollow lower portion. Leaf 225, for example, comprises a solid upper portion 227 (FIG. 16) and a hollow lower portion 227a made up of a curved outer plate 228 having inner radial plates 229 and 231 welded to it throughout its length to form the lower portion of leaf 225 as shown in FIG. 17. The upper and lower portions of leaf 225 are securely interconnected by extending plates 229, 228 and 231 upwardly around the lower portion of the solid top part 227 and welding as shown at 232. The leaves need not, of course, be fabricated exactly as shown but may be constructed in various other ways.

Since core 221 is shown as a straight-sided core, the lower portions of at least some of the leaves may be preferably provided with circumferentially disposed radially projecting portions 233 (FIG. 20) or other suitable radially projecting portions such as 233a (FIGS. 21 and 22) which are adapted to fit indentations such as 234 in the interior wall of a cooperatingly corrugated pile shell 236 (FIGS. 18–20) which is to be driven by the core. Projecting portions such as at 233 may be provided on all of the leaves or may be provided only on leaves 223 and 225 which are not raised prior to the remaining leaves as described below. If the core were tapered instead of being straight-sided, such an arrangement might not, of course, be necessary since the core would then engage a tapered pile shell in the manner previously described above.

Figure 18:
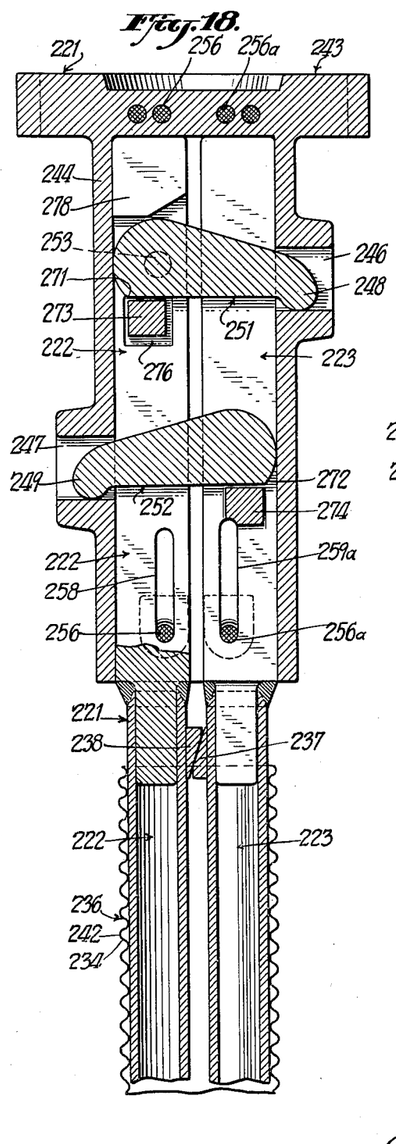
FIG. 18 is a vertical sectional view partly broken away taken at line 18—18 of FIG. 14 showing further details of the pile core shown in FIG. 14 and with the core in expanded condition.
Figure 19:
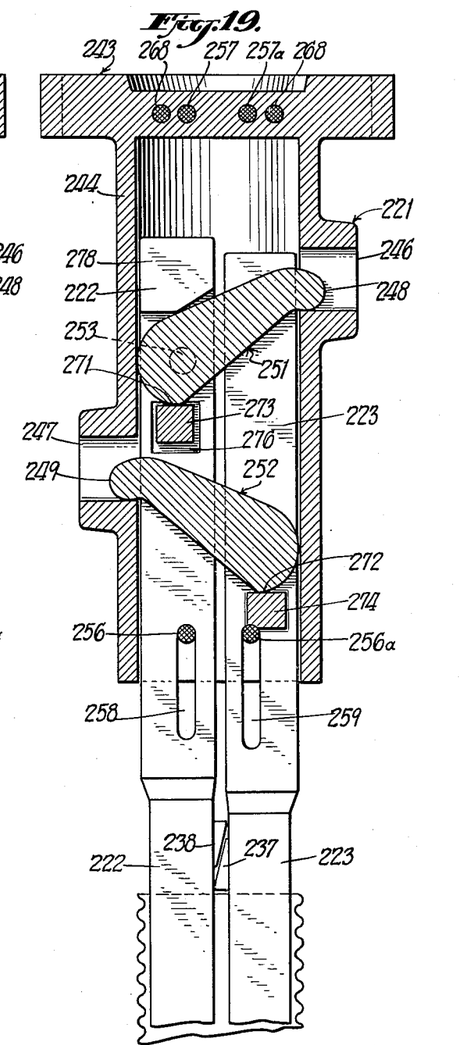
FIG. 19 is a sectional view similar to FIG. 18 but showing the core in a collapsed condition.
Figure 20:
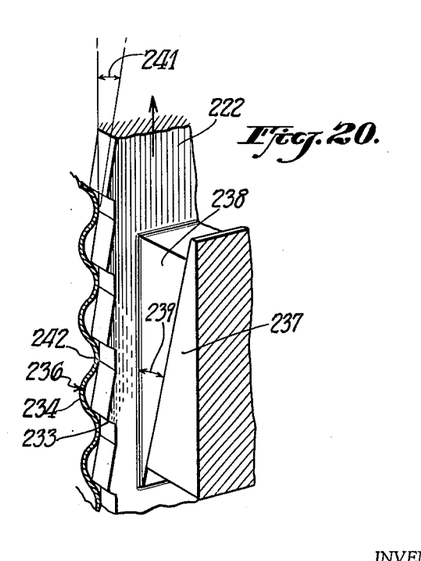
FIG. 20 is a partial perspective view showing in greater detail the operation of the wedges in the pile core shown in FIG. 14.

The leaves of the core are separated from each other by pairs of wedges such as 237 and 238 (FIGS. 17 and 20). Such wedges are used to separate each of the leaves from the leaves adjacent to it and are used at intervals throughout the lower portion of the pile core. These wedges are cooperatively disposed and function in the same manner as wedges 46 and 47, previously described, to permit expansion or collapse of the pile core with relative longitudinal movement of the leaves when leaves 222 and 224 are raised as described below. Core 221 is shown in FIG. 18 in its expanded or driving condition and in FIG. 19, in its collapsed condition during withdrawal from the pile shell. The wedges allow adjacent leaves to move closer together as well as in towards the center of the core as the core is collapsed. As shown in FIGS. 17 and 20, the arrangement of wedges is such that the inward and upward movement of leaves 222 and 224 makes it possible for leaves 223 and 225 to collapse inwardly as the core is raised following the collapse of leaves 222 and 224.

With reference to FIG. 20, it can be seen that where the leaves 222 and 224 are provided with portions 233, wedges 237 and 238 are constructed so that the wedge angle 239 is equal to or greater than angle 241 of the projections 233 to allow the projecting portions 233 on the leaves to be moved inwardly to collapsed position without undesirable engagement with inwardly projecting portions such as 242 of the pile shell. This precaution need not of course be observed in the design of cores for use with tapered or uncorrugated pile shells.

As in the case of pile core 21, it may occur with pile core 221 that the direct upward pull on one or more of the leaves may not be sufficient to collapse the core without pulling the pile shell out of the ground. To overcome this difficulty the construction and arrangement of the mechanism described below may be provided whereby leverage may be exerted to force upward movement of leaves 222 and 224 while temporarily preventing such movement by leaves 223 and 225. From FIGS. 14–19 it can be seen that the core is provided with a core head 243 which has a downwardly extending sleeve 244. Such sleeve may be formed integrally with the core head or may be formed separately and attached to the core head. Sleeve 244 fits around the outside of the solid upper ends such as 227 of the leaves and (see FIG. 18) has openings 246 and 247 into which end portions 248 and 249 of cam levers 251 and 252 extend. These levers are rotatably attached to leaves 222 and 224 by pins such as 253.

The leaves 222 and 225 are secured to core head 243 by a wire cable 256, which passes through holes 257 (FIG. 16) in the core head and through slots 258 and 258a in leaves 222 and 225 respectively. The ends of this cable may be secured together with a cable clamp 261. Similarly, leaves 223 and 224 are secured to the core head by a cable 256a passing through a hole 257a in the core head and slots such as 259 and 259a cut through leaves 223 and 224.

Core head 243 may be raised by means of a cable sling 267 passing through holes 268 (FIGS. 16 and 19) in the core head. When it is desired to collapse the core 221 from its expanded condition after driving has been completed, the core head 243 is raised by means of sling 267. The upward movement of the core head and attached sleeve 244 forces the ends 248 and 249 of levers 251 and 252 upwards from the solid line positions of FIG. 18 to the dotted line positions. This in turn forces cam portions 271 and 272 of levers 251 and 252 downward against cam blocks 273 and 274 which are secured respectively to leaves 225 and 223 as by welding. Recesses such as 276 are provided in the leaves 222 and 224 so that the cam blocks may project completely under cam portions 271 and 272 of the levers without contacting and thus producing friction with leaves 222 and 224 on which the levers are pivoted.

Raising the core head 243 thus produces an upward force acting on leaves 222 and 224 and a downward force acting on leaves 223 and 225. This force is, of course, multiplied by the mechanical advantage produced through levers 251 and 252. By operating the levers through the sleeve 244 it is possible to obtain a mechanical advantage based on utilizing a lever length approximately equal to the diameter of the pile core. Since the leaves cannot expand or move downward further due to the restraining effect of the pile shell, the force produced by raising the core head results in upward movement of the leaves 222 and 224 with respect to the other leaves 223 and 225 thus allowing all of the leaves to move inwardly towards the center of the core due to the action of the wedges. The raising of the core head with respect to the leaves coninues until the leaves are supported by the cables 256 and 256a rather than by the levers 251 and 252. At this point the leaves and levers have assumed approximately the position shown in FIG. 19.

In order to prevent the levers 251 and 252 from jumping out of the openings 246 and 247 during driving, lever stops such as 278 are provided. These lever stops are integral parts of the upper portions of leaves 222 and 224. The length of the slots cut through the leaves to receive cables 256 and 256a is carefully regulated with respect to the desired amount of lever action so that when such desired lever action has been completed the leaves will all be supported by cables 256 and 256a rather than by the lever system. Thus, when collapsing of the core has been completed through the use of the levers, the leaves will all be hanging from cables 256 and 256a as shown in FIG. 19 and the core may be further withdrawn by further upward movement of the core head. Latches (not shown) similar to latch 87 described in connection with core head 21 may be used if desired to retain core 221 in an expanded condition before and during driving.

Figure 21:
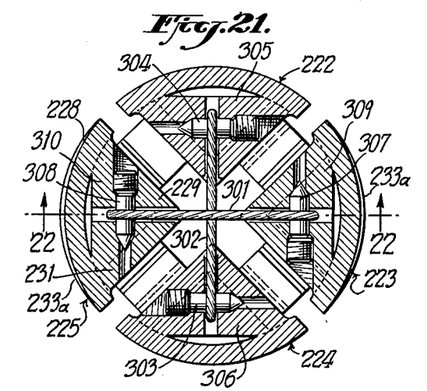
FIG. 21 is a transverse sectional view similar to FIG. 17 but showing the core at a lower point.
Figure 22:
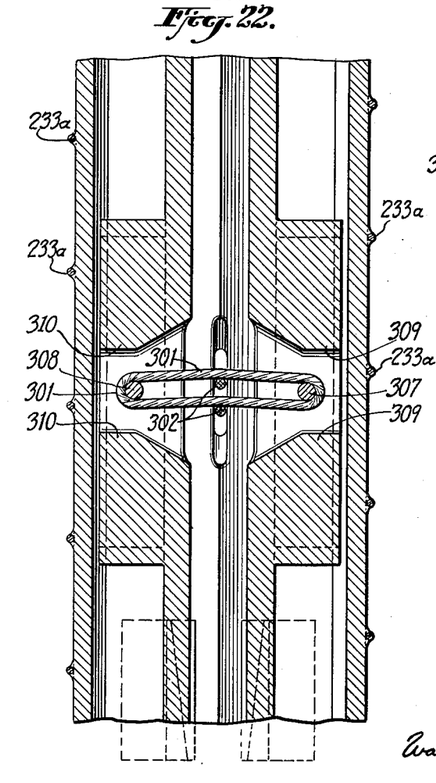
FIG. 22 is a partial longitudinal sectional view of the lower portion of the pile core shown in FIG. 14 taken as indicated by the line 22—22 in FIG. 21.

As the leaves 222 and 224 are raised with respect to the leaves 223 and 225 as described above, it is desirable to provide means for urging the various leaves towards each other to the extent permitted by the relative movement of the leaves and the positions of the wedges. For this purpose a series of resilient wire cable loops or grommets may be provided at spaced regions along the length of the core. Referring to FIGS. 21 and 22, such grommets may be provided as shown in interlaced pairs as at 301 and 302, with the upper and lower strands of grommet 302 passing under the upper and lower strands of grommet 301, respectively. Grommet 302 is secured at its ends to leaves 222 and 224 as by means of pins 303 and 304 around which the grommet 302 passes. These pins are carried in blocks 305 and 306 which are secured to the leaves 222 and 224 as by welding. The grommet 301 is likewise secured to the leaves 223 and 225 by pins 307 and 308 around which the ends of the grommet pass. The pins 307 and 308 are similar to the pins 303 and 304 and are carried by blocks 309 and 310 which are similar to blocks 305 and 306 and are secured to the leaves 223 and 225 as by welding.

The grommets are resilient and preferably comprise loops of helically twisted wire cable. From FIGS. 21 and 22, it can be seen that when the leaves 222 and 224 are raised relative to the leaves 223 and 225, the ends of grommet 302 are pulled upward and, since grommet 302 is interlaced with grommet 301, an upward displacing force is exerted on the central portion of grommet 301. At the same time the central portion of grommet 302 is deflected in a downward direction. These deflections of the grommets cause an inward pull on each of the pins which hold same and result in movement of the leaves inwardly toward the center of the core so that any projections such as the projecting portions 233 may clear the inwardly projecting corrugations of the shell as the core is withdrawn from the pile shell.

Figure 31:
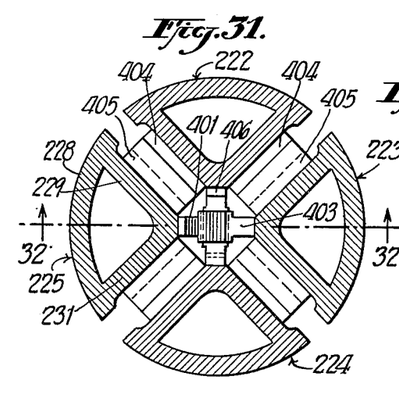
FIG. 31 is a transverse sectional view similar to FIG. 21 but showing the core at another lower point.
Figures 32, 33B, 33C:
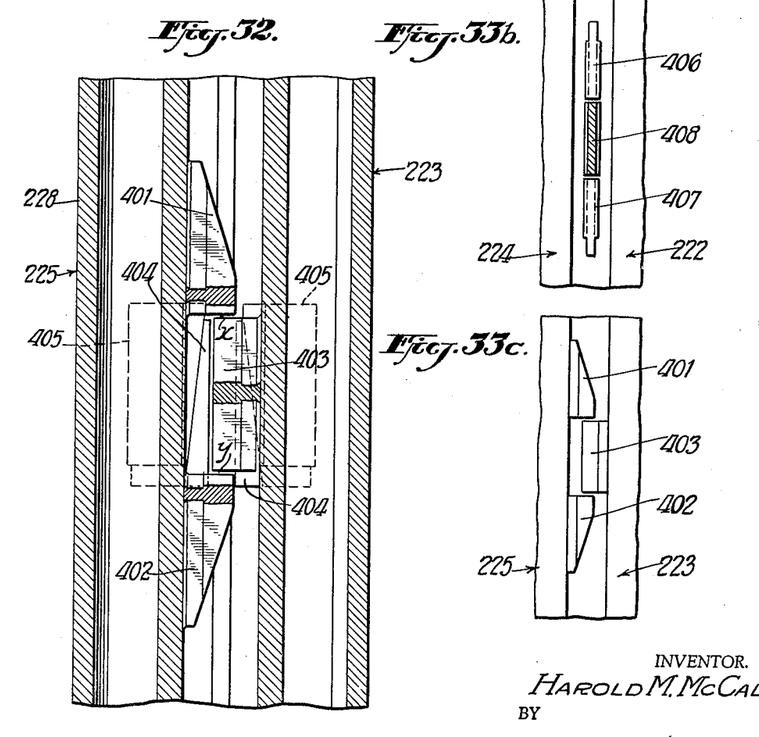
FIG. 32 is a longitudinal sectional view of a portion of the core shown in FIG. 14 taken as indicated by the line 32—32 in FIG. 31.
FIGS. 33a and 33c are similar to FIG. 32, but constitute views partly broken away and showing respectively two spaced-apart sets of certain lug arrangements as per FIG. 32; and the intermediate
FIG. 33b is a similar view taken at right angles to FIGS. 33a and 33c and showing similar lug arrangements on other leaves.
Figure 33A:
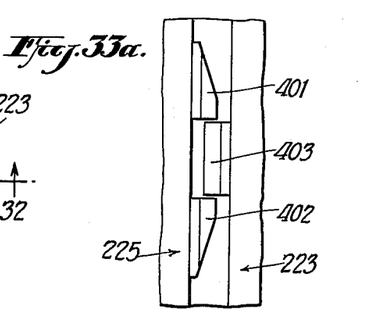

During driving pile cores such as here involved, the pile shell frequently encounters obstacles such as rocks which tend to deflect the shell and core and thus apply strong bending forces thereto. In order to strengthen such cores to resist such bending forces, it is desirable to provide means for interrelating two or more of the leaves so as to produce an increased amount of rigidity among the leaves and thereby increase the ability of the core to withstand bending stresses. FIGS. 31, 33a, etc. illustrate one method of interlocking the leaves of core 221 in order to provide such rigidity. Similar means may be used with all of the core embodiments above described. As shown in FIG. 32, leaves 223 and 225 which move concurrently longitudinally, may be provided with sets of interlocking upper lugs 401 and lower lugs 402 carried on leaf 225 and intermediate lugs 403 carried on leaf 223. As indicated in FIG. 32, these lugs have cross sections (as shown by the cross-hatchings thereon) which include relatively thin supporting webs in order to avoid interference with the action of wedges 404 which are secured to leaf 222 and wedges 405 secured to leaves 223 and 225. These wedges are the same or similar to the wedges described above and, together with other similar wedges, perform the same functions in permitting movement of the leaves toward each other when leaves 222 and 224 are raised with respect to leaves 223 and 225. The longitudinal space between the lugs in each set is preferably quite small in order to reduce the amount of bending the core can undergo before the lugs come into engagement to strengthen the resistance of the core to bending stresses. That is, these lugs act in the following way. Assuming that the pile shell engages, for example, a rock, tending to bend the shell and the lower end of the core therein toward the left, then, as viewed in FIG. 32, the lower ends of the leaves 223 and 225 will tend to bend toward the left. Such bending will occur in a manner whereby the upper end of lug 403 on leaf 223 will promptly apply pressure to the lower end of lug 401 on leaf 225 at the area marked $x$ in this figure. Because of this engagement, leaves 223 and 225 will thereafter cooperate effectively to resist such bending in a manner similar to the way in which the upper flange of a fabricated steel beam cooperates with the lower flange thereof to resist bending if the upper and lower flanges are securely interconnected. On the other hand, assuming that a force tends to bend the lower portions of the leaves toward the right as viewed in FIG. 32, then the upper end of lug 402 will promptly come into engagement with the lower end of lug 403 at the region marked $y$, thereby strongly resisting further such bending toward the right. In effect, if the bending of the lower portions of the leaves is toward the right as viewed in FIG. 32, the interengaging lugs will cause the leaf 223 to come under more longitudinal compression than it otherwise would, whereas the leaf 225 will tend to be placed under more of a longitudinal tensional force. In addition to a strengthening the core against bending to one side or the other during driving, these lugs also act to strengthen the core against undue bending and possible breakage when it is being carried or handled in a generally horizontal position with long lengths thereof unsupported.

Leaves 222 and 224 may be similarly interlocked to stiffen them against bending movement by the use of upper lugs 406 and lower lugs 407 (FIG. 33b) secured to leaf 222 and intermediate lugs such as 408 secured to leaf 224. These lugs are similar in construction and operation to the lugs described above. As shown in FIGS. 33a and 33c, the sets of lugs 401, 402 and 403 which serve to interlock leaves 223 and 225, are interspaced longitudinally with respect to the sets of lugs 406, 407 and 408 which serve to interlock leaves 222 and 224. Since these sets of lugs do not interfere with the action of the wedges, it is necessary only to leave sufficient longitudinal space between them for the operation of the wire loops or grommets such as 301 and 302 as described above. It is thus possible to use sets of lugs as described above at frequent intervals throughout the length of the core. If desired, interlocking means such as the sets of lugs described above may be used to interlock outer edge portions rather than the inside portions of the leaves.

Figure 23:
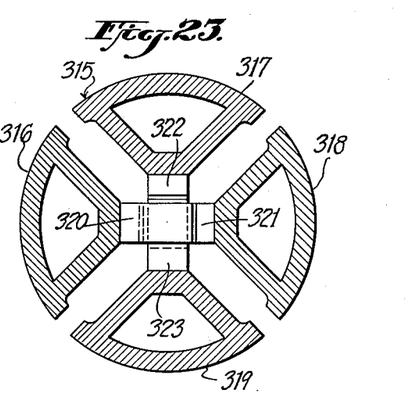
FIG. 23 is a transverse sectional view of a lower portion of a pile core similar to that shown in FIG. 14 but in which a modified arrangement of wedges is used.

FIG. 23 shows in section a pile core 315 which is generally similar to the pile core 221 described above and has leaves 316, 317, 318 and 319. Leaves 316 and 318 are separated from each other by longitudinally spaced pairs of cooperatively disposed wedges such as 320 and 321 which are secured to the leaves 316 and 318, respectively. The wedges 320 and 321 are of conventional shape similar to the wedges 237 and 238 described above. Leaves 317 and 319 are separated from each other by longitudinally spaced pairs of similar cooperatively disposed wedges such as 322 and 323 located at portions spaced vertically and intermediate the portions of wedges 320 and 321 and which, together therewith permit expansion or collapse of the core when leaves 316 and 319 are moved vertically with respect to the remaining leaves.

Figure 24:
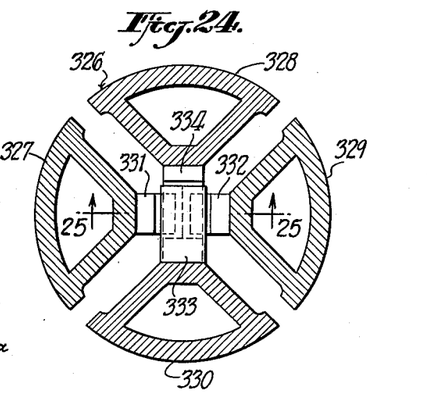
FIG. 24 is similar to FIG. 23 and shows another arrangement of wedges suitable for use in accordance with the invention.
Figure 25:
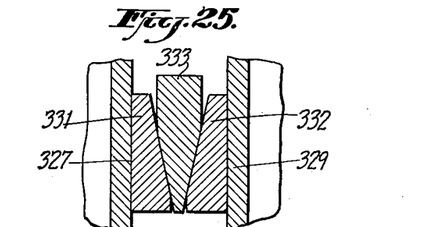
FIG. 25 is a fragmentary sectional view of the pile core illustrated in FIG. 24 taken as indicated by the line 25—25 in FIG. 24.

FIG. 24 shows in section another embodiment of a pile core 326 which is generally similar to core 221 described above and has leaves 327, 328, 329 and 330. The leaves 327, 329 and 330 are separated from each other by longitudinally spaced sets of cooperatively disposed wedges such as 331, 332 and 333 (shown in section, FIG. 25) which are secured to these leaves respectively. Likewise, the leaves 327, 328 and 329 (at other vertically interspaced locations) are separated from each other by similar sets of wedges such as a set including a wedge 334 which is similar to wedge 333 secured to leaf 328 and wedges similar to the wedges 331 and 332 secured to leaves 327 and 329. The manner in which these wedges cooperate can best be seen in FIG. 25. The core may be collapsed by raising leaves 328 and 330 with respect to the remaining leaves.

Figure 26:
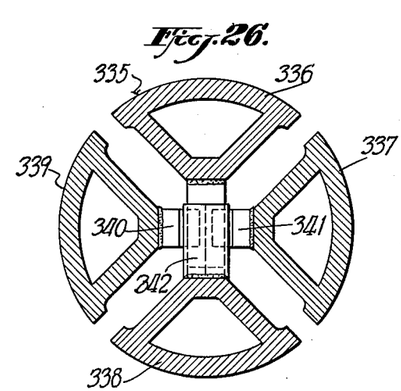
FIG. 26 is similar to FIG. 23 but showing a further modified arrangement of wedges suitable for use in accordance with the invention.

Another variation of the pile core 335 shown in FIG. 26 includes leaves 336, 337, 338 and 339. The leaves 337, 338 and 339 are separated from each other by longitudinally spaced sets of cooperatively disposed wedges such as 340, 341 and 342 which are analogous to wedges 331, 332 and 333 described above, while the leaves 336 and 338 are separated from each other by longitudinally spaced pairs of wedges similar to wedges 322 and 323 described above. This arrangement of wedges permits collapse of the pile core 335 with upward movement of leaf 338 with respect to the remaining leaves.

Figures 27, 27A, 28, 28A, 28B, 30:
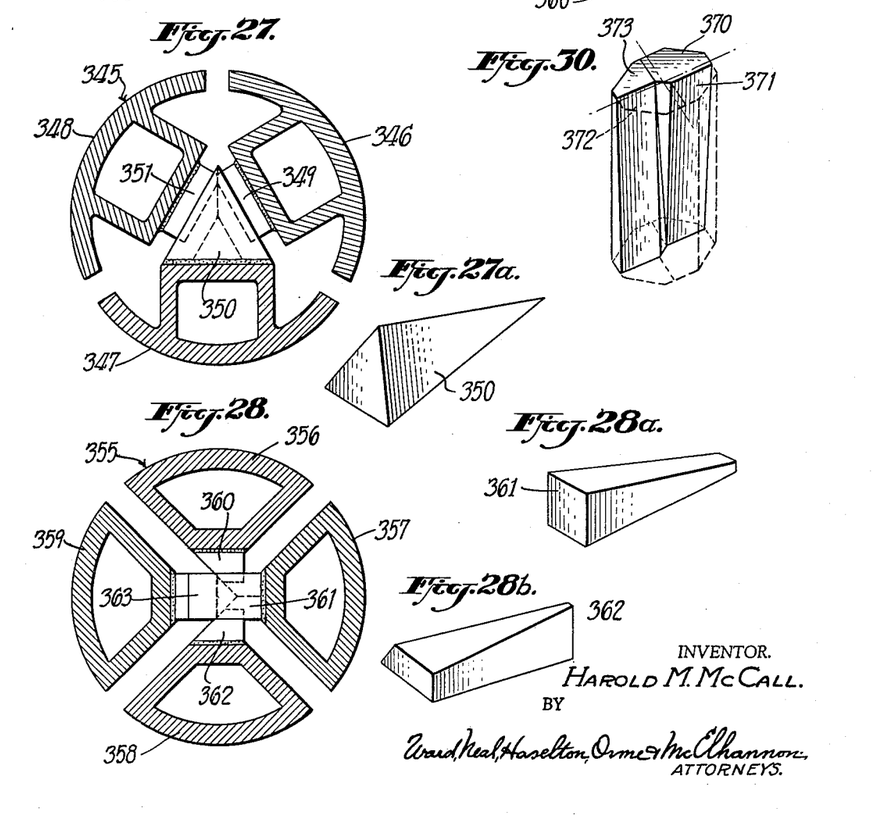
FIG. 27 is similar to FIG. 23 but showing another possible arrangement of the wedges.
FIG. 27a is a perspective view showing in greater detail one of the wedges shown in FIG. 27.
FIG. 28 is a transverse sectional view similar to FIG. 23 and showing still another possible arrangement of wedges.
FIG. 28a is a perspective view showing in greater detail one of the wedges shown in FIG. 28.
FIG. 28b is a perspective view showing in greater detail another of the wedges shown in FIG. 28.
FIG. 30 is a perspective view showing the operation of the wedges used in the arrangement of FIG. 29.

Referring to FIG. 27, a pile core 345, which is generally similar to pile core 221 described above, but has a further alternative form of wedge means and has three leaves 346, 347 and 348. These leaves are separated from one another by longitudinally spaced sets of cooperatively disposed wedges such as 349, 350 and 351. Wedges 349 and 351 are of conventional shape similar to the wedges 331 and 332 described above, while the wedges such as 350 have the shape shown in FIG. 27a. These wedges permit collapse of the core 345 when leaf 347 is raised with respect to the remaining leaves.

FIG. 28 shows the lower portion of still another pile core 355 which is generally similar to the core 221 described above and has four leaves 356–359. These leaves are separated from one another by longitudinally spaced sets of cooperatively disposed wedges 360–363. Wedge 363 is of conventional shape similar to wedges 331 and 332 described above, while wedge 361 has the shape indicated in FIG. 28a and wedges 360 and 362 are shaped as indicated in FIG. 28b. These wedges permit collapse of the core 355 when the leaf 357 is raised with respect to the remaining leaves.

Figure 29:
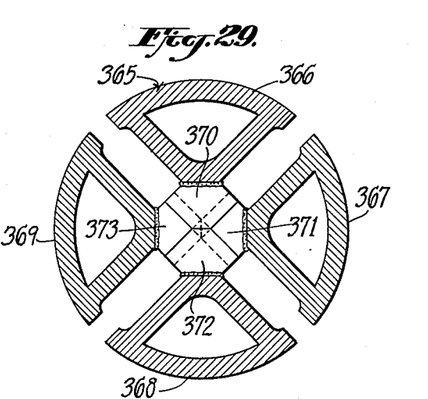
FIG. 29 is a sectional view similar to FIG. 23 and showing yet another arrangement of wedges suitable for use in accordance with the invention.

FIG. 29 shows a pile core 365 which is generally similar to pile core 221 described above and has leaves 366–369 which are separated from each other by another form of longitudinally spaced sets of cooperatively disposed wedges such as 370–373. These wedges are generally triangular in shape and cooperate as indicated in FIG. 30 to allow collapse of the core 365 by raising leaves 366 and 368 with respect to the remaining leaves.

The above described arrangements of wedges, among other possibilities, may all be used in accordance with the invention. It should be understood that any suitable arrangement of wedges operating circumferentially or radially or both may be used. Furthermore, in each instance where a pair of wedges coacts, one of the wedges may be in the form of a protuberance instead of the conventional wedge shape or one of wedge shapes shown and it should be understood the term wedges includes such a possibility.

While the invention has been described in detail with respect to certain preferred embodiments, it will be understood by those skilled in the art that various changes and modifications may be made without departing from the spirit and scope of the invention and it is intended to cover all such changes and modifications in the appended claims.

What is claimed and desired to be secured by Letters Patent is:

1. A collapsible core for driving pile shells comprising a plurality of longitudinally extending leaf structures movable outwardly to a larger expanded core diameter and inwardly to a smaller collapsed core diameter, one of said leaf structures being movable longitudinally relative to adjacent leaf structures; a plurality of pairs of longitudinally tapered engaging surface portions cooperatively disposed on opposed sides respectively of adjacent relatively movable leaf structures, said tapered surface portions being tapered in opposite directions for urging said leaf structures outwardly in response to movement of said one leaf structure longitudinally relative to said other leaf structures in one direction, and permitting inward movement of said leaf structures to collapsed condition in response to movement of said one leaf structure longitudinally in the other direction relative to the other said leaf structures; and means independent of said tapered surfaces for effecting said longitudinal movement of said one leaf structure relative to the other said leaf structures, said last mentioned means comprising levers mounted on said one leaf structure and rotatable about fulcrum axes, said levers having portions in driving engagement with said other leaf structures respectively, and a longitudinally movable rod in driving engagement with other portions of said levers.

2. A collapsible pile core for driving a pile shell comprising in combination four leaf structures arranged symmetrically about an axis; a plurality of pairs of co-acting wedges, the wedges of each pair being secured respectively to adjacent leaf structures, said pairs of wedges co-acting to separate said leaf structures to an extent dependent upon the relative longitudinal positions of said leaf structures, said wedges being so arranged that upward longitudinal movement of an opposed pair of said leaf structures relative to remaining leaf structures allows inward movement of said pair of leaf structures towards said axis; a core head adapted to receive driving forces and transmit same to said leaf structures, said core head being secured to said leaf structures by means permitting relative longitudinal movement of said core head and said leaf structures; lifting means secured to said core head and extending downwardly therefrom exteriorly of said leaf structures, said lifting means being movable upwardly by upward movement of said core head; and lever means operatively engaging said leaf structures and said lifting means and adapted to apply an upward force on said opposed pair of leaf structures while simultaneously applying a downward force on said remaining leaf structures when said lifting means is moved upwardly.

3. A collapsible pile core for driving a pile shell comprising in combination a plurality of longitudinal leaf structures including at least three thereof arranged about an axis; a plurality of pairs of co-acting wedges spaced lengthwise of said axis, the wedges of each pair being secured respectively to a first leaf structure and to one of the remaining leaf structures adjacent said first leaf structure, the engaging surfaces of said pairs of wedges being tapered in opposite directions and co-acting to separate said first leaf structure from said remaining leaf structures to an extent dependent upon the relative longitudinal positions of said leaf structures, said wedges in response to upward longitudinal movement of said first leaf structure relative to said adjacent leaf structures allowing inward movement of said first leaf structure towards said axis; a core head adapted to receive driving forces and transmit same to said leaf structures, means for securing said core head to said leaf structures permitting relative longitudinal movement of said core head and said leaf structures; a collapsing bar extending downwardly from said core head between said leaf structures, said bar being connected to the core head and movable upwardly by upward movement of said core head; lever means operatively connected to said collapsing bar and said leaf structures for applying an upward force on said first leaf structure while simultaneously applying a downward force on said remaining leaf structures in response to movement of said collapsing bar upwardly; and means for detachably securing all of said leaf structures in close relationship with said core head to maintain said core in an expanded condition.

4. A collapsible pile core for driving a pile shell comprising in combination four leaf structures arranged about an axis; a plurality of pairs of co-acting wedges, the wedges of each pair being secured respectively to adjacent leaf structures and co-acting to separate said leaf structures to an extent dependent upon the relative longitudinal positions of said leaf structures, said wedges further being so arranged that upward longitudinal movement of an opposed pair of said leaf structures relative to remaining leaf structures allows inward movement of said pair of leaf structures towards said axis; a core head adapted to receive driving forces and transmit same to said leaf structures, said core head being secured to said leaf structures by means permitting relative longitudinal movement of said core head and said leaf structures; a sleeve associated with said core head and extending downwardly therefrom exteriorly of said leaf structures; lever means associated with said leaf structures and said sleeve adapted to apply an upward force on said pair of leaf structures while simultaneously applying a downward force on said remaining leaf structures when said sleeve is moved upwardly.

5. A collapsible core for driving a pile shell comprising in combination a plurality of longitudinal leaf structures, means for separating at least one of said leaf structures from remaining leaf structures or structures to an extent dependent upon the relative longitudinal positions of said leaf structures whereby upward longitudinal movement of at least one of said leaf structures allows inward movement of said leaf structures toward each other, a core head adapted to receive driving impacts and transmit the same to said leaf structures, means for securing said core head to said leaf structures permitting relative longitudinal movement of said core head and said leaf structures, a collapsing bar extending downwardly from said core head between said leaf structures, said collapsing bar being connected to the core head and movable upwardly by upward movement of the core head, and lever means operatively connected to said collapsing bar and said leaf structures and adapted to apply an upward force on at least one of said leaf structures while simultaneously applying a downward force on the remaining leaf structures when said collapsing bar is moved upwardly.

6. A collapsible core for driving pile shells comprising a plurality of longitudinally extending leaf structures movable outwardly to a larger expanded core diameter and inwardly to a smaller collapsed core diameter, one of said leaf structures being movable longitudinally relative to adjacent leaf structures; a plurality of pairs of longitudinally tapered engaging surface portions cooperatively disposed on facing areas respectively of such leaf structures, said tapered surface portions being tapered in directions selected for urging said leaf structures outwardly in response to movement of said one leaf structure longitudinally relative to said other leaf structures in one direction, and permitting inward movement of said leaf structures to collapsed condition in response to movement of said one leaf structure longitudinally in the other direction relative to the other said leaf structures, and means independent of said tapered surfaces for effecting said longitudinal movement of said one leaf structure relative to the other said leaf structures, said last mentioned means comprising: levers mounted on said one leaf structure and rotatable about fulcrum axes, said levers having portions in driving engagement with said other leaf structures respectively, and a longitudinally movable rod in driving engagement with other portions of said levers.

7. A collapsible pile core for driving a pile shell comprising in combination a plurality of longitudinal leaf structures including at least three thereof arranged about an axis; a plurality of pairs of co-acting wedges spaced lengthwise of said axis, the wedges of each pair being secured respectively to a first leaf structure and to one of the remaining leaf structures, the engaging surfaces of said pairs of wedges being tapered in opposite directions and co-acting to separate said first leaf structure from said remaining leaf structures to an extent dependent upon the relative longitudinal positions of said leaf structures, said wedges in response to upward longitudinal movement of said first leaf structure relative to said adjacent leaf structures allowing inward movement of said first leaf structure towards said axis; a core head adapted to receive driving forces and transmit same to said leaf structures, means for securing said core head to said leaf structures permitting relative longitudinal movement of said core head and said leaf structures; a collapsing bar extending downwardly from said core head between said leaf structures, said bar being connected to the core head and movable upwardly by upward movement of said core head; and lever means operatively connected to said collapsing bar and said leaf structures for applying an upward force on said first leaf structure while simultaneously applying a downward force on said remaining leaf structures in response to movement of said collapsing bar upwardly.

8. A collapsible core for driving a pile shell comprising in combination a plurality of longitudinal leaf structures, pairs of co-acting wedge means secured to adjacent leaf structures, the wedge means of each pair having facing surfaces inclined in opposite directions for separating at least one of said leaf structures from remaining leaf structure or structures to an extent depending upon the relative longitudinal positions of said leaf structures whereby upward longitudinal movement of at least one of said leaf structures allows inward movement of said leaf structures toward each other, a core head adapted to receive driving impacts and transmit the same to said leaf structures, headed rod means of selected lengths for securing said core head to said leaf structures permitting longitudinal movement of said core head relative to all of said leaf structures as a group during initial lifting movement of such core head, and further longitudinal movement of said core head successively thereafter relative to selected of such leaf structures, a collapsing bar extending downwardly from said core head between said leaf structures, said collapsing bar being connected to the core head upwardly by upward movement of the core head, and lever means operatively connected to said collapsing bar and said leaf structures and adapted to apply an upward force on at least one of said leaf structures while simultaneously applying a downward force on the remaining leaf structures when said collapsing bar is moved upwardly.

9. A collapsible core for driving a pile shell comprising in combination a plurality of longitudinal leaf structures, pairs of co-acting wedge means secured to adjacent leaf structures, the wedge means of each pair having facing surfaces inclined in opposite directions for separating at least one of said leaf structures from remaining leaf structure or structures to an extent dependent upon the relative longitudinal positions of said leaf structures whereby upward longitudinal movement of at least one of said leaf structures allows inward movement of said leaf structures toward each other, a core head adapted to receive driving impacts and transmit the same to said leaf structures, headed rod means of selected lengths for securing said core head to said leaf structures permitting relative longitudinal movement of said core head and said leaf structures during lifting of such core head wherein the latter is movable relative to such leaf structures as a group and thereafter engages at least one such leaf structure to lift same and thereafter engages the remaining leaf structures to lift them also, a collapsing bar extending downwardly from said core head between said leaf structures, said collapsing bar being connected to the core head upwardly by upward movement of the core head, and lever means operatively connected to said collapsing bar and said leaf structures and adapted to apply an upward force on at least one of said leaf structures while simultaneously applying a downward force on the remaining leaf structures when said collapsing bar is moved upwardly.

10. A collapsible core for driving a pile shell comprising in combination a plurality of longitudinal leaf structures, pairs of co-acting wedge means secured to adjacent leaf structures, the wedge means of each pair having facing surfaces inclined in opposite directions for separating at least one of said leaf structures from remaining leaf structure or structures to an extent dependent upon the relative longitudinal positions of said leaf structures whereby upward longitudinal movement of at least one of said leaf structures allows inward movement of said leaf structures toward each other, a core head adapted to receive driving impacts and transmit the same to said leaf structures, headed rod means of selected lengths for securing said core head to said leaf structures permitting relative longitudinal movement of said core head and said leaf structures to engage and lift in succession selected of said leaf structures during core head lifting, a collapsing bar extending downwardly from said core head between said leaf structures, said collapsing bar being connected to the core head upwardly by upward movement of the core head, and lever means operatively connected to said collapsing bar and said leaf structures and adapted to apply an upward force on at least one of said leaf structures while simultaneously applying a downward force on the remaining leaf structures when said collapsing bar is moved upwardly.

11. A collapsible pile core for driving a pile shell comprising in combination a plurality of leaf structures arranged about an axis and numbering at least three; a plurality of pairs of engaging surfaces oppositely inclined longitudinally, said inclined surfaces of each pair co-acting to separate said leaf structures to an extent dependent upon the relative longitudinal positions of said leaf structures, said surfaces being so arranged that upward longitudinal movement of an opposed pair of said leaf structures relative to remaining leaf structures allows inward movement of said pair of leaf structures towards said axis; a core head adapted to receive driving forces and transmit same to said leaf structures; and means for applying an upward force on said pair of leaf structures while simultaneously applying a downward force on said remaining leaf structures in response to movement of said core head upwardly.

12. A collapsible pile core for driving a pile shell comprising in combination four leaf structures arranged generally symmetrically about an axis; a plurality of pairs of wedges, the wedges of each pair being secured respectively to adjacent leaf structures and having opposed, cooperating surfaces inclined in opposite directions, said surfaces co-acting to separate said leaf structures to an extent dependent upon the relative longitudinal positions of said leaf structures, said wedges being so arranged that upward longitudinal movement of an opposed pair of said leaf structures relative to remaining leaf structures allows inward movement of said pair of leaf structures towards said axis; a core head adapted to receive driving forces and transmit same to said leaf structures; and means for applying an upward force on said opposed pair of leaf structures while simultaneously applying a downward force on said remaining leaf structures in response to movement of said core head upwardly.

13. A collapsible pile core according to claim 12, and further characterized in that each of the opposed pairs of leaf structures are tied together by a plurality of flexible loops, each of said loops between a first pair of said leaf structures being crossed and interlaced with a corresponding loop between the remaining pair of leaf structures whereby when said first pair of leaf structures is raised, the loops which tie same together engage and thereby apply tension to the loops which tie the remaining pair of leaf structures together and cause the same to be pulled up and towards one another.

14. A collapsible pile core according to claim 12, and further characterized in that opposed pairs of leaf structures are tied together by a plurality of flexible loops, each of said loops between a first pair of said leaf structures being crossed with and in a position to engage a corresponding loop between the remaining pair of leaf structures whereby when the first pair of leaf structures is raised, the engaging loops displace portions of each other vertically thereby pulling the leaves inwardly and permitting the core to collapse.

15. A collapsible pile core for driving a pile shell comprising in combination a plurality of longitudinal leaf structures arranged about an axis; a plurality of pairs of wedges disposed lengthwise of said leaf structures, the wedges of each pair being secured respectively to a first leaf structure and to one of the remaining leaf structures adjacent said first leaf structure, said pairs of wedges having opposed surfaces inclined in opposite directions and co-acting to separate said first leaf structure from said adjacent leaf structures to an extent dependent upon the relative longitudinal positions of said leaf structures, said wedges in response to upward longitudinal movement of said first leaf structure relative to said adjacent leaf structures allowing inward movement of said first leaf structure towards said axis; a core head adapted to receive driving forces and transmit same to said leaf structures; and means for applying an upward force on said first leaf structure while simultaneously applying a downward force on said remaining leaf structures.

16. A collapsible pile core for driving a pile shell comprising in combination a plurality of longitudinal leaf structures arranged about an axis; a plurality of pairs of co-acting longitudinally inclined engaging surfaces mounted respectively on adjacent leaf structures, the surfaces of each of said pairs being inclined in opposite directions and co-acting to separate a first leaf structure from adjacent leaf structure or structures to an extent dependent upon the relative longitudinal positions of said leaf structures, said surfaces in response to upward longitudinal movement of said first leaf structure relative to said adjacent leaf structures allowing inward movement of said first leaf structure towards said axis; a core head adapted to receive driving forces and transmit same to said leaf structures; and means for applying an upward force on said first leaf structure while simultaneously applying a downward force on said adjacent leaf structures.

17. A collapsible core for driving pile shells comprising in combination a plurality of longitudinal leaf structures including at least three thereof, at least one of which is movable longitudinally with respect to others for collapsing the core, and a plurality of longitudinally spaced sets of cooperatively disposed lugs secured to at least two of said leaf structures respectively which are not relatively movable longitudinally, said lugs being in vertical alignment normally to interlock to transmit shear forces between such leaf structures and thereby strengthen the core against bending forces, pivot means mounting said last-named two leaf structures for spreading and closing movement thereof relative to one another and thus participate in the collapse of said core in response to positioning of said longitudinally movable leaf structure in a core collapsing location relative to the other leaf structures.

18. A collapsible core for driving pile shells comprising in combination two pairs of opposed longitudinal leaf structures, one pair being movable longitudinally relatively to the other pair, means associated with adjacent leaf structures and adapted to separate said leaf structures to an extent dependent upon the relative longitudinal positions of said pairs of leaf structures, respectively, a core head adapted to receive driving forces and transmit same to said leaf structures, means for applying an upward force upon one of said pair of leaf structures while simultaneously applying a downward force on said remaining leaf structures in response to movement of said core head upwardly, and a plurality of longitudinally spaced sets of lugs mounted on the leaves of each pair of leaf structures and cooperatively disposed therebetween, the lugs of each set interlocking while the core is in an expanded condition to transmit shear forces between the leaf structures of each pair, thereby strengthening the core against bending forces.

References Cited in the file of this patent
UNITED STATES PATENTS

| | | |
|---|---|---|
| 700,707 | Raymond | May 20, 1902 |
| 1,199,722 | Upson et al. | Sept. 26, 1916 |
| 1,403,766 | Gillies | Jan. 17, 1922 |
| 1,827,015 | Jenkins | Oct. 13, 1931 |
| 1,912,089 | Moe | May 30, 1933 |
| 2,928,252 | McKee | Mar. 15, 1960 |